United States Patent [19]
Parkison

[11] 3,906,983
[45] Sept. 23, 1975

[54] DIVERTER VALVE

[75] Inventor: Richard G. Parkison, Somerville, N.J.

[73] Assignee: American Standard, Inc., New York, N.Y.

[22] Filed: June 5, 1974

[21] Appl. No.: 476,507

[52] U.S. Cl. .............................. 137/119; 137/467
[51] Int. Cl.² ........................................ F16K 31/44
[58] Field of Search ......... 4/148; 137/119, 467, 801

[56] References Cited
UNITED STATES PATENTS

| | | | |
|---|---|---|---|
| 3,559,690 | 2/1971 | Palmer | 137/467 |
| 3,656,503 | 4/1972 | Ward | 137/119 X |
| 3,746,031 | 7/1973 | Christianson | 137/119 |
| 3,801,997 | 4/1974 | Ward | 137/119 X |

Primary Examiner—Robert G. Nilson
Attorney, Agent, or Firm—James J. Salerno, Jr.; Robert G. Crooks

[57] ABSTRACT

A diverter valve for use in connection with a spout, such as a bathtub spout, to divert water from the bathtub spout to another outlet, such as a showerhead is disclosed. The diverter valve is housed within the downturned spout end and is adapted to reciprocate toward and away from the discharge opening to divert the water from discharging into the tub or through the showerhead. The diverter valve body is in the form of a hollow spool with means provided to mount an actuating handle to reciprocate the valve within the spout end. When the spout is open to the tub, the water discharges from the spout end by way of two paths through the diverter valve, around the spool and through the hollow center of the spool. When the handle is manipulated to divert water to the showerhead, the two paths are closed by two separate valving means each having an elastomer sealing member which have a slight, prescribed difference in sealing diameter. This slight difference in effective sealing area results in a hydraulic force that keeps the diverter in a closed position as long as the supply source is open. When the supply source is shut off after showering, the inlet pressure to the diverter valve decreases to near atmospheric pressure allowing the diverter valve to open automatically because of gravity and the force derived from the upper elastomeric member returning to its as-molded shape.

19 Claims, 5 Drawing Figures

DIVERTER VALVE

FIELD OF THE INVENTION

This invention relates to diverter valves and more particularly to diverter valves for connection with a water spout, such as a bathtub spout, in which the diverter valve is employed to divert the water from the bathtub to the showerhead.

Diverter valves have heretofore been employed in association with plumbing fixtures in which the valve is positioned upstream of the spout outlet to a plumbing fixture such as a bathtub and depends upon the pressure against the valve closure member such as a gate to maintain it in its closed or shower position until, upon shutting off the water supply, the pressure against the valve is essentially removed so as to cause the valve to open. The diverter valve is thereby in a position for filling a tub the next time the supply is opened. Such valves are usually hard to operate which is inconvenient; and further, because of this, the user has difficulty in manipulating the handle to its full diverting position, and a substantial amount of water may be wasted from the spout end while showering. Moreover, such valves often develop difficulties such as failure to automatically divert and water leaks through the stems which are impossible to repair, and replacement of the entire spout assembly is required and is expensive. A number of diverter valves have been patented and are referred to below as being exemplary of the prior art.

A conventional diverter spout in which the diverter valve is mounted within the spout body remote from the spout discharge opening is shown and described in U.S. Pat. No. 3,387,816.

U.S. Pat. No. 3,419,914 describes another type of diverter valve which provides an inflatable chamber in which the water pressure provides the force to inflate and expand the pressure chamber so as to hold the valve in a position to stop water from flowing to the tub spout.

Another type of diverter valve is described in U.S. Pat. No. 3,656,503 and provides a cup-type valve positioned at the downturned end of the spout body to control water flow.

Another type of diverter valve is described in U.S. Pat. No. 3,801,997 and uses a replaceable cartridge assembly that consists of a spool within a cage and provides flow straightening vanes.

SUMMARY OF THE INVENTION

It is an object of the invention to provide a diverter valve of the type which is disposed at the downturned end of a water spout and reciprocally mounted within the discharge passage formed therein.

It is another object of the invention to provide an improved diverter valve which is free of leakage at the tub spout when in the closed or shower position.

Still another object of the invention is to provide an improved diverter valve that will automatically return to its normally open position substantially instantaneously when the water supply is shut off after showering.

It is another object of the invention to provide a diverter valve that is easy to operate by using hydraulic pressure developed by the diverter valve in a way that assists the user in manipulation of the handle, especially when diverting water flow from the tub to the showerhead.

It is another object of the invention to preclude leakage from the actuating means at all times, during manipulation of the handle and during either diverting position.

The invention generally contemplates an improved diverter valve and spout assembly. The diverter valve is housed within the downturned spout end and is adapted to reciprocate toward and away from the discharge opening to divert water from discharging into the tub or through the showerhead. The diverter valve body is in the form of a hollow spool with means mounted thereon for manipulating the valve within the spout end to divert the flow of water to the tub or shower position. The diameter of the valve body is less than the diameter of the discharge passage in the downturned end of the spout. Two separate elastomeric seal means are associated with the valve body and are arranged and constructed so as to form a liquid tight seal between the valve body and the inner surface of the discharge passage when the diverter valve is in the closed or shower position. The two seal means are of different diameters to provide a hydraulic force to keep the diverter valve closed to the tub while showering, and yet the difference in diameters is small enough to allow the diverter to automatically open to the tub when the water is shut off. The weight of the moving elements of the valve in addition to elasticity of the deflected upper seal provide sufficient force to overcome the residual pressure in the system caused by the water in the riser pipe to the shower and to automatically open the diverter valve substantially instantaneously when the supply is shut off.

Other features and advantages of the diverter valve of the invention herein will be better and more clearly understood from the following detailed description and explanation when considered with reference to the accompanying drawings.

DESCRIPTION OF THE PREFERRED EMBODIMENTS

Figure 1:
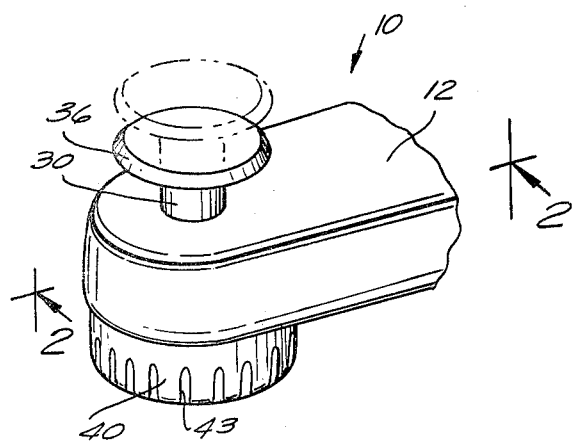
FIG. 1 is a fragmentary isometric view of the downturned spout end and diverter valve assembly of the present invention.
Figure 4:
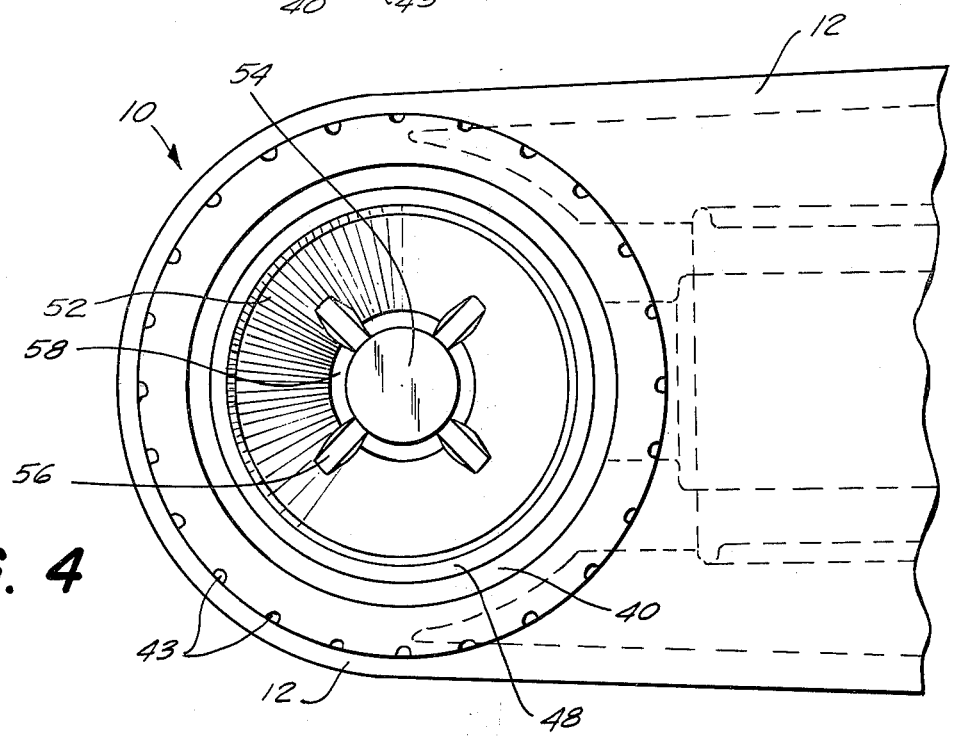
FIG. 4 is a bottom plan view of the diverter valve and spout assembly of FIG. 1.
Figure 5:
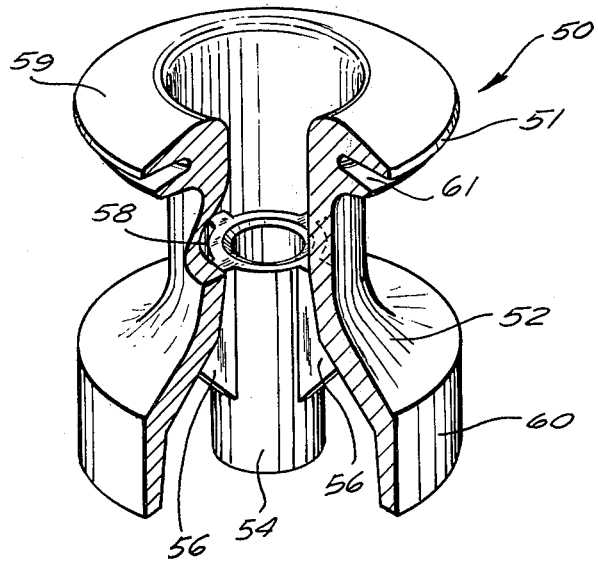
FIG. 5 is an isometric view of the diverter valve body partially broken away to illustrate the positioning and mounting of the central core within the spool body.

Referring to the embodiment illustrated in FIGS. 1 through 5 which is given merely for exemplary purposes, there is shown in FIG. 1 a diverter valve and spout assembly 10.

Figure 3:
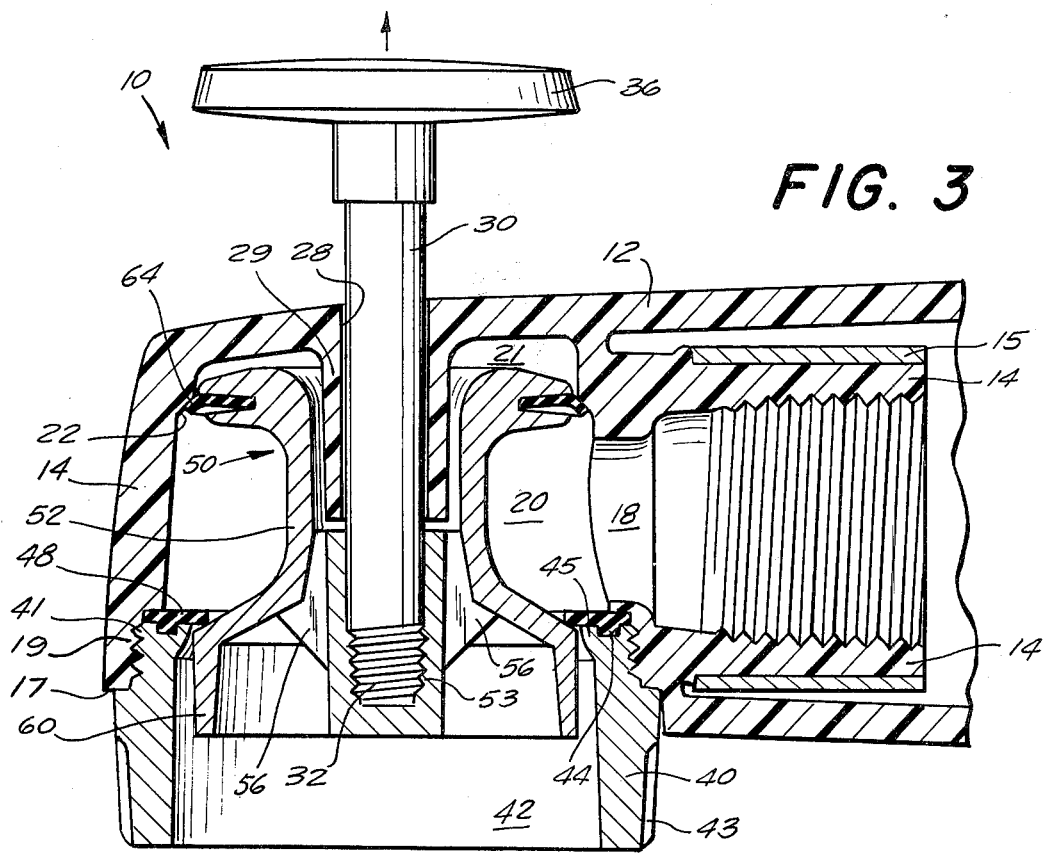
FIG. 3 is a view similar to FIG. 2 but illustrates the diverter valve in its closed or shower position.

Spout body 12 has integrally formed therewith female pipe threaded section 14 positioned along the center line or longitudinal axis of spout body 12 adjacent the forward or downward spout end 16. Threaded pipe section 14 has an opening 18 and serves as the entrant opening for introducing water into diverter chamber 20 formed in the downturned spout end 16 of spout 12. Formed integrally with spout body 12 and positioned axially along the vertical axis of diverter chamber 20 is cylindrical tube or hollow boss 29 which extends into the diverter chamber 20 and provides a guide for diverter stem 30. The downturned end 16 of spout body 12 is provided with female threaded end 19 at its open lower end 17 to provide coupling means for mounting in threaded engagement tubular spout end 40 which has complimentary male threaded end 41. Diverter chamber 20 along with the passage in tubular spout end 40 forms discharge passage 21 for conducting water through the entrant opening 18, through discharge passage 21 and through the discharge opening 42 at spout end 40. Bevelled annular surface 22 is in diverter chamber 20 and is positioned adjacent the closed end thereof to provide a valve seat or surface for forming a liquid tight seal with resilient seal means associated with the diverter valve assembly when the diverter valve 50 is in the shower mode position as shown in FIG. 3. Spout body 12 is preferably made of a suitable heat resistant, high strength plastic material which can be molded in one piece. A suitable plastic material sold by G. E., Polymer Product Division, under the tradename Noryl which may be used is a modified polyphenylene oxide thermo-plastic resin which is formulated from a patented process for oxidative coupling of phenolic monomers.

Noryl is a platable resin and is suitable for coating a film of desired metal by vapor deposition. Metals that may be vapor deposited are chromium, copper, brass, aluminum or the like. Spout 12, stem 30 and handle 36 preferably plated with chromium to blend in with the generally chromium plated fittings used in kitchens, bathrooms or the like. Obviously the diverter valve and spout assembly may be made from all metallic materials.

Figure 2:
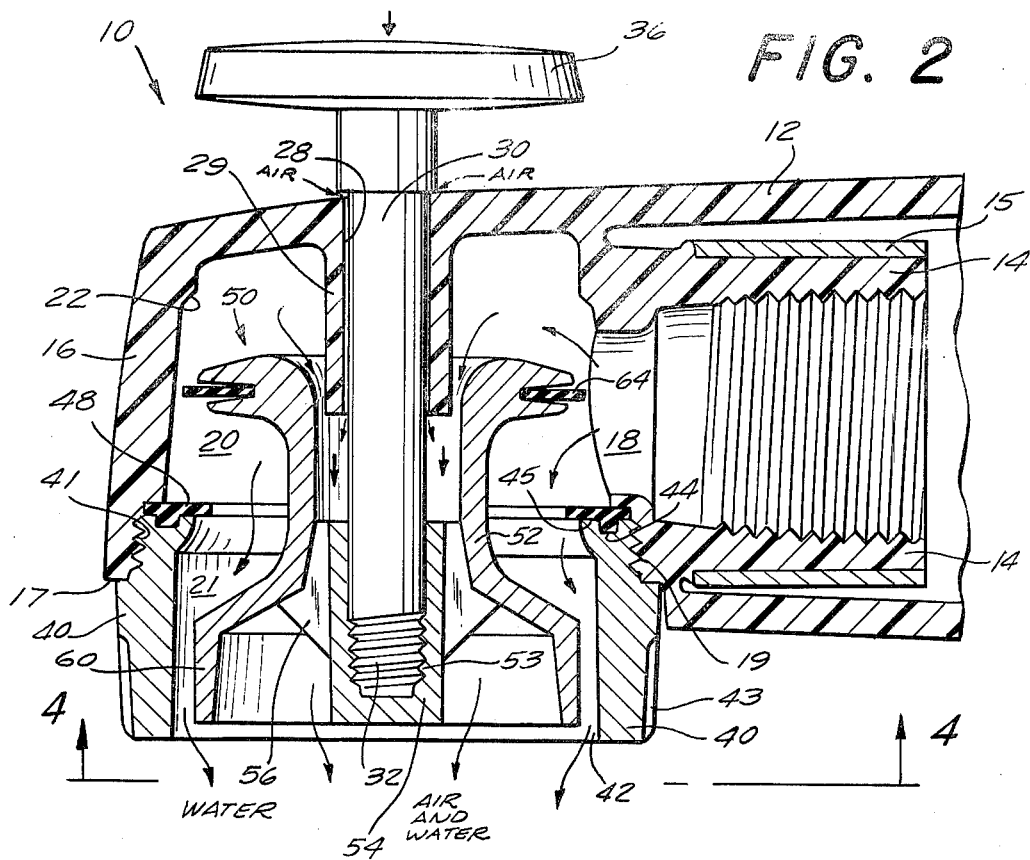
FIG. 2 is a sectional view of the diverter valve and spout taken along the arrows 2—2 of FIG. 1 which illustrates the diverter valve in its normally open or tub position.

Spout end 40 directs the flow of water downward into the tub when diverter valve 50 is in its normally open position. A circumferential annular groove 44 is formed in the inner end face 45 at its threaded end 19 to provide a means for centering resilient sealing washer 48 thereon. Resilient washer 48 extends radially inwardly into diverter chamber 20 to provide a flexible area or portion for contacting surfaces of diverter valve 50 to form a liquid tight seal with respect thereto. When spout end 40 is coupled to downturned end 16 of spout 12 resilient washer 48 forms a compression fit with the corresponding surfaces of spout end 40 and downturned spout end 16 as shown in FIGS. 2 and 3. Seal ring 48 also forms a liquid tight seal between downturned spout end 16 and spout end 40. Spout end 40 is formed having a plurality of radially spaced circumferential grooves 43 formed around its lower outer surface which provides an area for gripping the spout end piece to facilitate its threading into threaded end 19 of downturned spout end 16.

A diverter valve 50 is housed within discharge passage in the downturned spout end 16 of spout 12 and is also preferably made of Noryl, although any similar type plastic resin having similar characteristics may be used.

Diverter valve 50 is in the form of a hollow spool and has an outer shell 52 and an inner core 54 which is spaced from the outer shell 52 and is mounted in fixed position by supporting arms 56. Supporting arms 56 are preferable uniformly spaced around core 54 which provides a path for a portion of water to pass downwardly through the inner section of valve body 52 when the diverter valve 50 is in its normally open or tub position as illustrated in the direction of the arrows shown in FIG. 2. However, as water passes downwardly through downturned spout end 16 it is predominantly conducted around outer shell 52 through the discharge opening 42 illustrated by the direction of the arrows shown in FIG. 2.

The space between supporting arms 56 form passages 58 having a cross sectional area sufficiently large to break the the cohesive forces of water and to prevent capillarity within passages 58 so that the chamber 21 and passages 58 are emptied of water and replaced with air to restore atmospheric pressure within chamber 21 when the water supply is shut off after showering. If chamber 21 were not emptied, the water-locked chamber would create a negative pressure that would prevent the automatic opening of the diverter valve. The magnitude of this resisting force would be equal to the weight of a cylinder of water having a diameter equal to the diameter of the upper seal and the height of passage 58. After the water is shut off diverter valve 52 will automatically return immediately from the shower mode position of FIG. 3 to its normally open position of FIG. 2.

Outer shell 52 is formed having an upper rim 59 and a lower skirt 60. Upper rim 59 is provided with a circumferentially formed groove 61 formed around its peripheral edge 51. Disposed in groove 61 is upper resilient sealing member 64 which is capable of forming a liquid tight seal with bevelled surface 22 of downturned spout end 16 when diverter valve 50 is moved upward into the shower mode position which is illustrated in FIG. 3.

Both upper seal ring 64 and lower seal ring 48 are made of suitable resilient material such as natural or synthetic elastomers. It has been found that Buna N rubber of 70 durometer performs quite satisfactorily. It will be noted that outside diameter of upper seal washer 64 that mates with surface 22 is larger than the inner diameter of seal washer 48 that mates with surface 52 of spool 50. The difference in these sealing areas results in a force that holds the diverter valve in the closed or shower position in FIG. 3 when the water source is open. It may also be noted that water pressure acts on the sealing lips of both washers to hold them firmly against their mating surfaces 22 and 52 to further aid in establishing a water tight seal.

When the water source is turned off, the diverter valve automatically returns immediately to its normally open position. In the preferred embodiment, there are two forces that combine to open the valve, the weight of the movable components of the diverter valve, and the elasticity of the upper seal washer. As can be seen in FIG. 3, the lip of the seal washer 64 is appreciable deflected when the water supply is on, and subsequently tends to assume its normal flat shape when the supply source is shut off, thereby tending to force spool 50 down and the diverter valve to its open position. These two forces combine to overcome the small opposing force caused by the head of water in the riser pipe to the showerhead, and the valve automatically opens substantially instantaneously.

Inner core 54 is cylindrically formed having a threaded bore 53. Stem 30 has a complimentary threaded end 32 for coupling stem 30 to diverter valve 50 through the opening in boss 29 of formed spout body 12. A manipulating handle 36 is provided at the other end of stem 30 for reciprocating diverter valve 50 toward and away from discharge opening 42. Boss 29 provides a guide for diverter stem 30 which loosely fits within the bore of boss 29 so as not to inhibit freedom of movement of the diverter valve 50.

Diverter valve 50 is formed having a diameter less than the diameter of diverter chamber 20 and spout end 40. When assembling diverter valve 50 in downturned spout end 16 diverter valve 50 is inserted into diverter chamber 20. Spout end 40 and resilient seal ring 48 is threaded into position on threaded section 19 of downturned spout end 16, then manipulating handle 36 and stem 30 is inserted through bore 28 of boss 29 and threaded into bore 53 of core 54. If for any reason it is necessary to remove diverter valve 50 the procedure for assembly is reversed. It is not necessary to remove spout 12 from the pipe nipple as is necessary for other types of diverter valves and spout assemblies.

In operation the spout body and diverter valve assembly 10 is mounted to a suitable threaded nipple extending from a wall (not shown) on threaded section 14. A metal ring 15 may be mounted on threaded section 14 of spout 12 if of plastic material to reinforce the threaded section 14 and to prevent breaking the threaded section when mounting the spout to the wall. To facilitate mounting the diverter valve and spout assembly, a tubular member not shown, preferably made of plastic is employed. The tube has an outer diameter equal to the inner diameter of spout end 40 and is inserted therein and acts as a wrench to tighten spout 12 onto the threaded nipple extending from the wall (not shown). When the bathtub is being filled, the water enters the diverter chamber 20 through entrant opening 18 and passes downwardly around valve body 52 through the discharge passage 21 and through outlet opening 42. Also a portion of the water is conducted downwardly through diverter valve 50 through passages 58 of valve 50. A reduced pressure or venturi effect occurs as water passes downward around the end of boss 29 and prevents water from leaking upwardly around the stem 30 and out of the top surface of downturned spout end 16. When diverter valve 50 is moving upwardly toward the shower mode position a reduced pressure is created above valve body 50 as upper flange 59 approaches bevelled surface 22. As upper flange 50 further approaches the bevelled surface 22 of diverter chamber 20, upper seal ring 64 is bent slightly upwardly by water pressure exerted against its under surface and a hydraulic assist occurs. This hydraulic assist is of great convenience to the user, since this action occurs when a substantial pressure builds up in the chamber which would make the final closing manually, quite difficult. Diverter valve 50 automatically moves upwardly into liquid tight sealing engagement when the radially extending surfaces of resilient seal ring 64 contacts bevelled surface 22 in diverter chamber 20 and then is deflected as illustrated in FIG. 3. Also lower seal ring 48 is deflected slightly against the outer shell 52 so that the bevelled surface of shell 52 contacts the radially extending section of seal ring 48 to form a liquid tight seal therewith. In the shower mode position illustrated in FIG. 3 water is diverted from diverter chamber 20 upwardly to the showerhead with substantially no leakage of water through upper and lower seal rings 54 and 48 respectively so that substantially no water passes through discharge opening 42.

As discussed above when handle 36 is lifted to divert water flow to the showerhead the diverter valve obtains a hydraulic assist so that the user can lift the diverter valve easily with little effort.

Also, as indicated above, there is usually no need for the user to manipulate the diverter knob to the tub fill position since this occurs automatically when the supply is shut off after showering. However the user, if he should so desire while showering, can divert water from the shower to the tub by manually pushing on the knob and overcoming the differential hydraulic force that holds the diverter valve closed.

While many changes may be made in design it is obvious that various types of material changes and shapes may be made without departing from the invention as defined in the appended claims.

What is claimed is:

1. In combination, a diverter valve and spout having a downturned spout end,
    said spout having spaced water inlet and water discharge openings and a discharge passage formed in the downturned spout end and positioned between said spaced openings,
    said diverter valve housed within the downturned spout end and including a valve body in the form of a hollow spool to provide an auxiliary path for water to pass downwardly therethrough when the diverter valve is moved toward the discharge opening,
    said diverter valve mounted for reciprocation within the downturned spout end,
    spaced resilient seal means associated with said valve body and the surfaces defining the discharge passage within the downturned end to provide a substantially liquid tight seal when said diverter valve is reciprocated away from the discharge opening,
    said spaced resilient seal means including upper and lower seal rings having differing effective sealing areas so that when the diverter valve is moved axially away from the discharge opening the resulting hydraulic forces exerted on said sealing areas cause the diverter valve to move upwardly and to hold the resilient sealing means against the corresponding seats to provide a liquid tight seal and said upper seal ring being deflected by the water passing through the valve so that when the water supply is shut off, the deflected upper seal ring provides a force in addition to the gravitational forces to break the water tight seal and to automatically shift the diverter valve toward the discharge opening.

2. The diverter valve of claim 1 wherein the discharge passage formed in the downturned end includes a generally cylindrical spout end piece removably mounted in the downturned spout end,
    said end piece having means for mounting a lower resilient circular sealing member between the end surface of the end piece and the downturned end surfaces of the spout.

3. The diverter valve of claim 2 wherein the downturned end of the spout and end piece is provided with complimentary threads formed thereon for mounting in threaded engagement therewith.

4. The diverter valve of claim 2 wherein the end surface of the end piece is formed with an annular groove for removably mounting the resilient sealing member therein, said lower sealing member mounted in said groove and a portion thereof extending radially outwardly from said end surface for contacting the valve body to provide a liquid tight seal therewith when the valve body is moved away from the discharge opening.

5. The diverter valve of claim 1 wherein the valve body includes an outer shell and an inner core,
said inner core is mounted in fixed position and is spaced from said outer shell by radially extending arms so that the spaces formed between said arms provide a plurality of passageways for conducting water downwardly through the hollow spool when the diverter valve is in its normally open position.

6. The diverter valve of claim 5 wherein the core is formed with a centrally threaded opening for threadedly receiving the reciprocating means.

7. The diverter valve of claim 1 wherein said hollow spool has a diameter less than the diameter of said chamber formed in the downturned spout end.

8. The diverter valve of claim 1 wherein the reciprocation means includes a stem for coupling to the valve body for reciprocation within the downturned spout end and a handle for manipulating the valve body toward and away from the discharge opening.

9. The diverter valve of claim 1 wherein the hollow spool includes an upper rim and a lower skirt spaced therefrom,
said upper rim having a circumferentially formed groove for mounting an upper resilient circular sealing member,
said upper resilient member mounted in said groove and a portion thereof extending radially outwardly from said rim and which is deflected when contacting the inner surfaces of the discharge passage to provide a liquid tight seal between the inner surface of the discharge passage and the valve body when the spool is moved away from the discharge opening and which assists the spool to move towards the discharge opening and at the same time breaking the water tight seal at the lower seal ring.

10. The diverter valve of claim 1 wherein the resilient sealing means includes an upper-resilient member mounted on the spool body and a lower resilient member mounted in the downturned spout end and positioned toward the discharge opening,
said upper sealing member having an area of sealing diameter greater than the sealing area of the lower sealing member so as to provide a hydraulic pressure upwardly to form liquid tight seals between the corresponding surfaces of the valve body and discharge passage in the downturned spout end.

11. The diverter valve of claim 5 wherein said passageway means includes a plurality of passages radially disposed in said spool body and each of said passageways having a cross-sectional area sufficiently large so as to break the cohesive forces of water and to prevent water being held therein by capillarity.

12. A diverter valve adapted to be housed within the downturned end of a spout,
the spout having spaced water inlet and water discharge openings and a discharge passage formed in the downturned spout end and positioned between the spaced openings,
the diverter valve comprising:
a valve body mounted for reciprocation within the passage of the downturned spout end,
reciprocating means mounted on the valve body for moving the valve body toward and away from the discharge opening,
spaced resilient seal means associated with the valve body and being adapted to engage the surfaces of the discharge passage in a liquid tight seal when the diverter valve is reciprocated away from the discharge opening,
said spaced resilient seal means including upper and lower seal rings having differing effective sealing areas so that when the diverter valve is moved axially away from the discharge opening the resulting hydraulic forces exerted on said sealing areas cause the diverter valve to move upwardly and to hold the resilient sealing means against the corresponding seats to provide a liquid tight seal and said upper seal ring being deflected by the water passing through the valve so that when the water supply is shut off, the deflected upper seal ring provides a force in addition to the gravitational forces to break the water tight seal and to automatically shift the diverter valve toward the discharge opening.

13. The diverter valve of claim 12 wherein the hollow spool includes an upper rim and a lower skirt spaced therefrom,
said upper rim having a circumferentially formed groove for mounting an upper resilient circular sealing member,
said upper resilient member mounting in said groove and a portion thereof extending radially outwardly from said rim for contacting the inner surfaces of the discharge passage to provide a liquid tight seal between the inner surface of the discharge passage and the valve body when the spool is moved away from the discharge opening.

14. The diverter valve of claim 13 wherein the valve body includes an outer shell and an inner core,
said inner core is mounted in fixed position and is spaced from said outer shell by radially extending arms so that the spaces formed between said arms provide a path for conducting water downwardly through the hollow spool when the diverter valve is in its normally open position.

15. The diverter valve of claim 14 wherein the core is formed with a centrally threaded opening for threadedly receiving the reciprocating means.

16. The diverter valve of claim 15 wherein the reciprocating means includes a stem for coupling to the valve body for reciprocation within the downturned spout end and a handle for manipulating the valve body toward and away for the discharge opening.

17. A diverter valve mounted for reciprocation within the downturned spout end of a spout comprising:
said spout having spaced water inlet and water discharge openings and a chamber formed in the downturned spout end and positioned between said space openings,
said diverter valve including a valve body in the form of a hollow spool to provide an auxiliary path for water to pass downwardly therethrough and which is adapted to move axially within the chamber toward and away from the discharge opening, reciprocating means mounted on the spool body for moving the spool toward and away from the discharge opening, spaced resilient seal means associated with the valve body and arranged and constructed to seat and unseat with spaced surfaces associated with said valve body and said chamber to provide a substantially liquid tight seal when the diverter valve is reciprocated away from the discharge opening, and said spaced resilient seal means including upper and lower seal rings having differing effective sealing areas so that when the diverter valve is moved axially away from the discharge opening the resulting hydraulic forces exerted on said sealing areas cause the diverter valve to move upwardly and to hold the resilient sealing means against the corresponding seats to provide a liquid tight seal and said upper seal ring being deflected by the water passing through the valve so that when the water supply is shut off, the deflected upper seal ring provides a force in addition to the gravitational forces to break the water tight seal and to automatically shift the diverter valve toward the discharge opening.

18. The diverter valve of claim 17 wherein said spaced surfaces are annular seats spaced above and below the water inlet opening and are arranged and constructed to form a liquid tight seal with said spaced seal means when said diverted valve is moved axially away from the discharge opening.

19. The diverter valve of claim 17 wherein said resilient spaced seal means includes an upper resilient member mounted on the spool body and having a sealing area extending radially outwardly therefrom and a lower resilient member mounted below the water inlet and having a sealing area extending radially inwardly in said chamber, said upper seal ring having an effective sealing area greater than the sealing area of said lower seal ring so as to provide a water pressure having an upward resultant force for holding said spool against said spaced surfaces to form a liquid tight seal.

* * * * *